Figure 1:
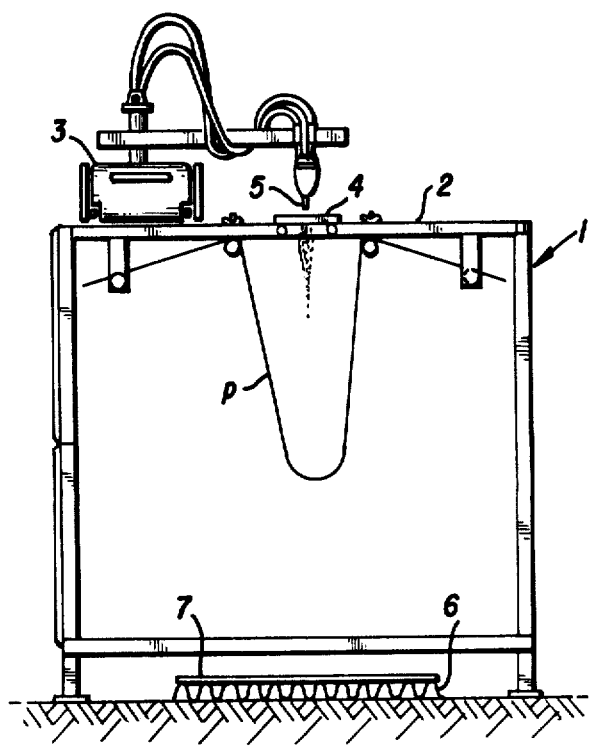

United States Patent [19]

Morimoto et al.

[11] Patent Number: 4,496,469
[45] Date of Patent: Jan. 29, 1985

[54] HEAT-INSULATING REFRACTORY MATERIAL CONSISTING ALKALI TITANATE AND SILICON RESIN

[75] Inventors: Takuo Morimoto, Kyoto; Kihachiro Nishiuchi, Tokushima; Misao Izumi, Tokushima; Noriyoshi Ejima, Tokushima, all of Japan

[73] Assignee: Otsuka Kagaku Yakuhin Kabushiki Kaisha, Osaka, Japan

[21] Appl. No.: 455,492

[22] Filed: Jan. 4, 1983

[30] Foreign Application Priority Data

Jan. 12, 1982 [JP] Japan ................................. 57-3625
Jan. 26, 1982 [JP] Japan ................................ 57-11421
Jan. 26, 1982 [JP] Japan ................................ 57-11422

[51] Int. Cl.³ ............................................. C04B 43/02
[52] U.S. Cl. ................................... 252/62; 427/387; 428/447; 428/701; 501/134; 524/413; 524/588
[58] Field of Search ................. 252/62; 428/447, 701; 501/134; 524/413, 588; 427/387

[56] References Cited

U.S. PATENT DOCUMENTS

| | | | |
|---|---|---|---|
| 2,841,470 | 7/1958 | Berry | 252/62 |
| 3,328,117 | 6/1967 | Emslie et al. | 501/134 |
| 3,455,732 | 7/1969 | Hathaway | 428/447 |
| 4,064,224 | 12/1977 | Kawamata et al. | 423/598 |
| 4,085,084 | 4/1978 | Merrill | 524/588 |
| 4,179,496 | 12/1979 | Yanagida et al. | 425/598 |
| 4,385,158 | 5/1983 | Mikami et al. | 524/588 X |

FOREIGN PATENT DOCUMENTS

| | | | |
|---|---|---|---|
| 685020 | 4/1964 | Canada | 501/134 |
| 2100745 | 1/1983 | United Kingdom | 252/62 |
| 876630 | 11/1981 | U.S.S.R. | 252/62 |

OTHER PUBLICATIONS

Hawley, "The Condensed Chemical Dictionary", Van Nostrand Reinhold Co., p. 332.

*Primary Examiner*—John E. Kittle
*Assistant Examiner*—Mukund J. Shah
*Attorney, Agent, or Firm*—Armstrong, Nikaido, Marmelstein & Kubovcik

[57] ABSTRACT

A heat-insulating refractory coating composition or heat-insulating refractory film chiefly comprising an alkali titanate and a silicone resin, and a heat-insulating refractory sheet comprising an inorganic core material and a heat-insulating refractory layer.

41 Claims, 1 Drawing Figure

HEAT-INSULATING REFRACTORY MATERIAL CONSISTING ALKALI TITANATE AND SILICON RESIN

The present invention relates to materials having outstanding heat-insulating and refractory properties.

Heat-insulating materials are important from the viewpoint of savings in energy and resources. Heating devices for air conditioning, cooking devices, heat sources for heating, high-temperature reactors, and heat accumulators and piping systems for transferring heat have walls which are exposed to high temperatures. Prevention of dissipation of heat from such walls and prevention of accidental overheating of the walls are important problems in assuring savings in energy, safe and sound work environments and prevention of fires and other hazards. Accordingly it has been desired to provide heat-insulating materials having outstanding resistance to heat or high temperatures for use in such devices. Since heat-insulating materials useful for these devices must be resistant to hot atmospheres of 200° to 400° C., it is considered difficult to use organic materials, so that various heat-insulating inorganic materials have been developed.

Organic materials heretofore developed and thought useful as heat-insulating materials include foams having a closed cellular structure, such as polyurethane foam, polystyrene foam and polyethylene foam. However, for long-term use, these materials are resistant only to temperatures of up to 150° C.

On the other hand, heat-insulating inorganic materials are available in the form of shaped bodies partly having a foamed structure and prepared from an inorganic binder, such as calcium silicate or alkali silicate, and asbestos or like fibers. Further glass fibers, asbestos, rockwool and like inorganic fibers are also used singly as such. While these shaped bodies or fibers are used for covering walls in direct contact therewith for heat insulation, it is difficult to apply these materials to devices of complex shape, or not infrequently they must be applied by an in situ procedure, so that difficulties are encountered in checking the heat-insulating work as to whether it is carried out completely as designed. These methods of heat insulation resort to the heat-insulating effect afforded by a small layer of air which is present between the heat-insulating material and the wall to which it is applied, such that although the material maintains a low temperature at the outer side thereof which is out of contact with the heat source of high temperature, the material undesirably absorbs heat at the other side thereof closer to the heat source to result in a large energy loss. Further conventional heat-insulating inorganic materials have the serious drawback that they are applicable only to the outer wall surfaces of hot heat-source devices, thus failing to prevent heat losses due to the conduction of heat through the wall material. Accordingly it has been desired to provide heat-insulating coating compositions which are applicable to the inner wall surfaces of devices to reduce the heat loss due to heat conduction through the wall material. Nevertheless, coating compositions having high heat resistance at high temperatures, especially heat-resistant binders, still remain to be developed as a great problem of the art. Although inorganic binders, for example, of silicic acid and phosphoric acid types are available as such binders, they are unsatisfactory in adhesion to metals, bending strength and resistance to water and chemicals, whereas organic binders have the problem that many of them are resistant only to temperatures of up to 150° C. for prolonged use.

Organopolysiloxane binders are known as organic binders which are heat resistant at high temperatures of 200° C. or above and are therefore widely used for heat-resistant coating compositions, but because of various limitations involved in the use of the binders of this type, they have found use only in coating compositions which are resistant to heat at high temperatures. Accordingly heat-insulating coating compositions have yet to be developed which have high resistance to heat at high temperatures and also heat-insulating properties.

Further sheets or the like made predominantly of asbestos fibers, aluminum foil or flame-retardant plastics are usually used for protecting the human body from high temperatures or scattering incandescent iron particles during iron or steel making operation or for protecting the human body and neighboring inflammables and materials from slag during welding or thermal cutting operation. However such heat-insulating refractory materials presently used have drawbacks and are not satisfactory for the contemplated purposes. The material made chiefly of asbestos fibers has low durability in respect of mechanical strength, resistance to water, etc. The material made chiefly of aluminum foil, although having good heat-insulating properties against radiant heat, is low in mechanical strength, therefore easily permits penetration of slag particles impinging thereon during welding or cutting and is ineffective for protection. Further the material made chiefly of flame retardant plastics is not only substantially ineffective against incandescent iron or slag particles but is also likely to evolve toxic gases when decomposed by the heat of iron or slag particles.

Aside from the foregoing conventional materials, composite sheets have also been proposed which comprise, for example, a glass fiber fabric coated with a layer of asbestos fibers or particles of ceramics, silica or glass, but these sheets are not very useful since the coating layer has low heat-insulating properties and readily permits penetration of hot iron or slag particles impinging thereon. Although a refractory sheet has recently been proposed which comprises a fabric of glass fibers and silicon varnish layer coating the surface of the fabric and having dispersed therein a heat-resistant inorganic material in the form of scales and an inorganic pigment, the sheet similarly remains to be improved in heat-insulating properties despite improved refractory properties.

As generally described above, conventional heat-insulating refractory materials have advantages and disadvantages, are not satisfactory and have yet to be improved, while attention should be directed to the fact that the sheets made chiefly of asbestos and heretofore most widely used have been suspected of being carcinogenic in recent years, with a trend to place a ban on the use of such sheets mainly in U.S. and European countries.

We have already accomplished an invention relating to solar heat insulating coating compositions and heat-insulating refractory coatings as heat-insulating coating materials containing alkali metal titanates, especially potassium titanate and filed a patent application therefor. While conducting further research to develop heat-insulating coating compositions which have excellent resistance to heat at high temperatures for the savings in energy and resources and which are applicable to inner wall surfaces of devices when desired, we have become aware of points of improvement in respect of the recipe of coating compositions, heat-insulating characteristics, heat resistance, adhesion etc. which are apparent only to those who have actually made developing efforts.

An object of the present invention is to provide a coating composition having outstanding heat-insulating and refractory properties.

Another object of the invention is to provide a heat-insulating refractory coating composition for coating inner wall surfaces of devices to reduce the heat loss due to the conduction of heat through the material of such walls.

Another object of the invention is to provide a material in the form of a sheet or film having outstanding heat-insulating and refractory properties and effective for reflecting especially radiant heat.

Another object of the invention is to provide a material in the form of a sheet or film which remains stable, free of decomposition, combustion or melting even when brought into contact with slag or high-temperature articles.

Still another object of the invention is to provide a material in the form of a film or sheet which assures safety and which does not permit hot slag particles or the like to form holes therein even when impinging thereon.

The present invention provides a heat-insulating refractory material, particularly a heat-insulating refractory coating composition or heat-insulating refractory film chiefly comprising an alkali titanate and a silicone resin, and a heat-insulating refractory sheet comprising an inorganic core material and a heat-insulating refractory layer.

The alkali titanates to be used for this invention are known compounds represented by the formula $$M_2O \cdot nTiO_2 \cdot mH_2O$$

wherein M is an alkali metal such as Li, Na or K, n is a positive real number of up to 8, and m is O or a positive real number of up to 4. More specific examples of such alkali titanates are those having a structure of the common salt type and represented by $Li_4TiO_4$ and $Li_2TiO_3$ ($0<n<1$, $m=O$), and those of tunnel structure represented by $Na_2Ti_7O_{15}$, $K_2Ti_6O_{13}$ and $K_2Ti_8O_{17}$ ($n<6$, $m=O$), etc. Of these, potassium hexatitanate and hydrates thereof represented by the formula $K_2O \cdot 6TiO_2 \cdot mH_2O$ wherein m is as defined above give greatly improved heat-insulating refractory properties to the desired end product and are therefore preferable. Alkali titanates including potassium hexatitanates are generally in the form of particulate or fibrous fine crystals. Of such alkali titanates, those at least 5 μm in fiber length and at least 20, preferably at least 100, in aspect ratio favorably give improved strength to the heat-insulating refractory materials of the invention. Especially fibrous potassium titanates, which are high in specific heat and excellent in heat-insulating properties, are very preferable in giving desired properties to the materials of the invention.

Potassium titanates easily form crystals of the formula $K_2O \cdot 4TiO_2$ or $K_2O \cdot 6TiO_2$ which have a refractive index of about 2.4. According to the invention potassium titanates in the form of fibrous crystals and having a high refractive index have proved especially suitable. When crystals of potassium titanate are treated with an inorganic acid such as hydrochloric acid, then washed with water and dried, some potassium atoms are removed from the crystals. The resulting crystals differ from those represented by $K_2O \cdot 4TiO_2$ and $K_2O \cdot 6TiO_2$ (hereinafter abbreviated as "4TK" and "6TK" respectively) and are potassium titanate crystals having a reduced potassium content (hereinafter referred to as "LKT").

Potassium titanate of any form can be dispersed in organic binders which are generally used. Thus when preparing a heat-resistant coating composition by dispersing a potassium titanate in a silicone resin of the organopolysiloxane type, any of 4TK, 6TK and LKT is usable. However, use of LKT with such a silicone resin affords a coating composition which gives coatings heat-resistant at temperatures of at least 350° C. and having excellent properties.

The alkali titanates useful in this invention can be in the form of fibrous or particulate crystals, crushed or pulverized particles of a melt of such a titanate, such crystals or particles treated with an acid for the removal of some alkali metal atoms, or such crystals or particles heated and annealed for oxidation. It is more preferable to use an alkali titanate which is obtained by heating titanate crystals at a temperature close to the melting point (about 1300° C.) and thereafter slowly cooling the crystals to room temperature at a rate of up to 100° C./hr, because the crystals can be relieved of thermal strain and made especially suitable for use in heat-insulating materials of the invention.

The silicone resins useful as binders in this invention include organopolysiloxane silicone resins, polyacryloxyalkylalkoxysilane silicone resins, polyvinylsilane silicone resins, etc.

Examples of useful organopolysiloxane silicone resins are straight silicone resins, such as polydimethylsiloxane, polydiphenylsiloxane, polymethylphenylsiloxane and copolymers of such siloxanes, which have at least one of substituents including hydrogen, vinyl, allyl, hydroxyl, alkoxy having 1 to 4 carbon atoms, amino and mercapto; epoxy-modified silicone resins obtained by reacting a straight silicone resin with an epoxy resin; polyester-modified silicone resins comprising a straight silicone resin and a condensation product of a polybasic acid and a polyhydric alcohol; alkyd-modified silicone resins obtained by reacting a straight silicone resin with a condensation product of a fatty acid, a polybasic acid and a polyhydric alcohol, or by reacting a straight silicone resin with an alkyd resin; amino resin-modified silicone resins obtained by reacting a straight silicone resin with melamine-formaldehyde resin, urea-formaldehyde resin, guanamine resin obtained by reacting formaldehyde with benzoguanamine, acetoguanamine or the like, phenolic resin-modified silicone resins obtained by reacting a straight silicone resin with phenol-formaldehyde resin or like phenolic resin; etc. The silicone resin may be in the form of a mixture of at least two of these resins. In the case of polydimethylsiloxane silicone resins, those having a $CH_3/Si$ ratio of at least 1.2 to 1.8, preferably 1.3 to 1.7, are desirable. Phenyl-containing polysiloxane compounds such as polydiphenylsiloxane, polymethylphenylsiloxane, copolymer thereof, copolymer of polydimethylphenylsiloxane, polydiphenylsiloxane and/or polymethylphenylsiloxane are usable singly as binders of the invention. When modified silicone resins such as epoxy-modified silicone resin, polyester-modified silicone resin, alkyd-modified silicone resin and amino resin-modified silicone resin are used singly or in admixture as binders, the resulting compositions exhibit improved heat-resistant adhesive strength especially at 200° to 300° C. When modified silicone resins or mixtures of modified silicone resins and straight silicone resins are used as binders, it is preferable that the binders contain at least 20 wt. %, more preferably at least 30 wt. %, of polysiloxane component. When the polysiloxane content is at least 20 wt. %, exceedingly high heat resistance is available at temperatures of at least 200° C. The organopolysiloxane silicone resin can be used conjointly with an epoxy resin, polyester resin, alkyd resin, amino resin, phenolic resin, acrylic resin, ethylene-vinyl acetate copolymer or the like which is generally used as a binder for coating compositions, insofar as the polysiloxane content of the combined binder is at least 20 wt. %.

Examples of useful polyacryloxyalkylalkoxysilane silicone resins are polymers obtained by singly polymerizing acryloxyalkylalkoxysilane compounds represented by the formula

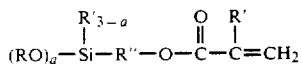

wherein R is a monovalent hydrocarbon group having 1 to 10 carbon atoms, R' is hydrogen or a monovalent hydrocarbon group having 1 to 12 carbon atoms, R" is a bivalent hydrocarbon group having 2 to 10 carbon atoms, and a is an integer of 1 to 3, in the presence of a free radical initiator and an organic solvent, and polymers obtained by reacting such compounds with at least one of α,β-unsaturated compounds represented by the formula

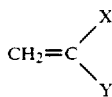

wherein X is H, CH₃ or Cl, Y is a member selected from the group consisting of H, Cl, a monovalent hydrocarbon group having 1 to 10 carbon atoms, vinylphenyl, pyridyl, 2-oxo-1-pyrrolidinyl, cyano,

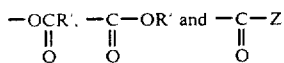

wherein R' is as defined above, and Z is a member selected from the group consisting of —OCH₂CH₂OH,

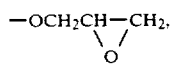

—NH₂, N-methylol and N-alkoxymethylol, and derivatives thereof under the same conditions as above.

Examples of suitable monovalent hydrocarbon groups as the groups R and R' in the silane compounds are methyl, ethyl, propyl, butyl, pentyl, hexyl, octyl, decyl and like alkyl groups, phenyl, naphthyl, tolyl, xylyl, cumenyl, ethylphenyl and like aryl groups, and benzyl, α-phenylethyl, β-phenylethyl, α-phenylbutyl and like aralkyl groups. Examples of bivalent hydrocarbon groups suitable as groups R" are ethylene, trimethylene, tetramethylene, hexamethylene, octamethylene, etc.

Examples of suitable α,β-unsaturated compounds represented by the formula

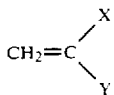

wherein X and Y are as defined above, and derivatives thereof are vinyl chloride, vinyl bromide, vinyl fluoride, vinylidene chloride, vinyl acetate, vinyl chloroacetate, vinyl propionate, vinyl butyrate, styrene, vinyltoluene, dimethylstyrene, ethylstyrene, chlorostyrene, bromostyrene, fluorostyrene, nitrostyrene, divinylbenzene, vinylpyridine, vinyl pyrrolidone and like vinyl compounds; acrylonitrile, methacrylonitrile, 2-chloroacrylonitrile, methyl acrylate, ethyl acrylate, butyl acrylate, 2-ethylhexyl acrylate, lauryl acrylate and like acrylates; methyl methacrylate, ethyl methacrylate, butyl methacrylate, 2-ethylhexyl methacrylate, lauryl methacrylate and like methacrylates; acrylic acid, acrylamide, N-methylolacrylamide, N-methoxymethylacrylamide, N-butoxymethylacrylamide, glycidyl acrylate, 2-hydroxyethyl acrylate, methacrylic acid, methacrylic acid amide, N-methylolmethacrylamide, N-methoxymethylmethacrylamide, N-butoxymethylmethacrylamide, glycidyl methacrylate, 2-hydroxyethyl methacrylate and like acrylic and methacrylic compounds having a reactive group.

When polyacryloxyalkylalkoxysilane silicone resins are used as binders in this invention, it is required that the resin contain at least 20 wt. %, preferably at least 30 wt. %, of an acryloxyalkylalkoxysilane compound to assure high resistance to heat.

According to the invention good results are obtained with use of polyacryloxyalkylalkoxysilane silicone resins containing 5 to 20 wt. % of acrylic and methacrylic compounds having a reactive group, especially acrylamides such as N-methylolacrylamide, N-methoxymethylacrylamide, N-butoxymethylacrylamide and derivatives thereof, glycidyl methacrylate, 2-hydroxyethyl methacrylate, etc. Especially good results are achieved when such resins further contain 5 to 30 wt. % of acrylonitrile.

The polyacryloxyalkylalkoxysilane silicone resins, when used, achieve the characteristic result that the coating obtained has good adhesion to metals, satisfactory flexibility and high resistance to water, boiling water and weather. Especially preferable in respect of adhesion, and resistance to water, weather and heat is a polyacryloxyalkylalkoxysilane silicone resin having a limiting viscosity (η) of 0.5 to 2.0 in a dimethylformamide solution at 30° C. and in the form of a copolymer of the following composition:

| Acryloxyalkylalkoxysilane | 20–50 wt. % |
|---|---|
| Acrylonitrile | 5–30 |
| Reactive acrylic compound | 5–20 |
| Acrylate or methacrylate | 5–60 |

Like acryloxyalkylalkoxysilane compounds, vinylsilane compounds of the formula

wherein a is an integer of 1 to 3, B is OR' or OR"—OR' (R' and R" are as defined above) are reacted singly or with at least one of α,β-unsaturated compounds of the formula

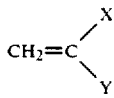

wherein X and Y are as defined above, and derivatives thereof in the presence of a free radical initiator and an organic solvent to obtain polymers which are useful as binders. The acryloxyalkylalkoxysilane compounds can be partly and equivalently replaced by or mixed with the vinylsilane compounds for preparing binders of the invention. Examples of suitable vinylsilane compounds are those in which R' is methyl, ethyl, propyl or butyl, and R" is ethylene, trimethylene or tetramethylene.

The foregoing silicone resins including organopolysiloxane silicone resins, polyacryloxyalkylalkoxysilane silicone resins and polyvinylsilane silicone resins can be used singly or in the form of a mixture of at least two of these resins. When self-extinguishing properties are important, these resins preferably have the following composition. In the case of organopolysiloxane silicone resins, the polysiloxane content is at least 70 wt. %. In the case of polyacryloxyalkylalkoxysilane silicone resins and polyvinylsilane silicone resins, up to 50 wt. %, more preferably up to 20 wt. % of ethylenically unsaturated monomers to be copolymerized. When both self-extinguishing properties and flexibility are important, unmodified organopolysiloxane silicone resins are preferable. Further, a phenol-modified silicone resin obtained from alkoxysilane and phenolic resin, especially novolak type phenolic resin is usable when flexibility is not so important. These silicone resins are provided in the form of solids, plastic pastes, liquids or emulsions or like dispersions at room temperature, and, when desired, are used with addition of a suitable solvent. Further when classified according to the curing mechanism, they are divided into those curable at room temperature, by heating, and by application of ultraviolet rays or electron rays. Conjointly usable with these resins are curing agents or curing promoting agents which are well known in the art, including carboxylates of metals such as zinc, lead, cobalt and iron; organotin compounds such as dibutyltin octoate and dibutyltin laurate; titanium chelate compounds such as tetrapropyl titanate and tetraoctyl titanate; tertiary amines such as N, N-dimethylaniline and triethanolamine; peroxides such as benzoyl peroxide, dicumyl peroxide and t-butyl peroxide; platinum catalysts; etc., whereby three-dimensional reticular structures are obtained.

In this invention, high-density and highly refractive inorganic compounds and/or inorganic compounds of platy crystal can be incorporated into the heat-insulating refractory coating composition. Further high-density and highly refractive inorganic compounds and/or endothermic inorganic compounds can be incorporated into the heat-insulating refractory film or sheet of this invention.

High-density inorganic compounds useful in this invention are those having a specific gravity of at least 2.8 and including powders of minerals such as dolomite, aragonite, apatite, spinel, corundum, zircon and synthetic minerals; solid solutions such as frit, fused phosphate fertilizer and analogous compositions which are prepared by the same method as the fertilizer; and particles, fibers or foams of high-density glass.

Further it is suitable to use inorganic compounds having a high refractive index of at least 1.50. Those exemplified above are all at least 1.50 in refractive index and are therefore preferable to use in this invention.

Examples of desirable inorganic compounds having such a high density (SG, specific gravity) and high refractive index are the following natural and synthetic minerals as pulverized to particles. Dolomite(SG 2.8~2.9 n=1.50~1.68) Magnesite (SG 3.0~3.1 n—1.51~1.72) Aragonite(SG 2.9~3.0 n=1.53~1.68) Apatite (SG 3.1~3.2 n=1.63~1.64) Spinel (SG 3.5~3.6 n=1.72~1.73) Corundum (SG 3.9~4.0 n=1.76~1.77) Zircon (SG 3.9~4.1 n=1.79~1.81) Silicon carbide (SG 3.17 n=2.65~2.69). As a solid solution, fused phosphate fertilizer is suitable. While clayey and micaceous minerals are available as inorganic compounds of platy crystal, powders of natural and synthetic micas are especially preferable.

Examples of useful endothermic inorganic compounds are of various types which release crystal water or carbon dioxide, absorb heat on decomposition, or undergo phase conversion, such as calcined gypsum, alum, calcium carbonate, aluminum hydroxide and aluminum silicate of hydrotalcite group.

The inorganic compounds of the invention are usable singly or in the form of a mixture in desired proportions. Apatite, zircon sand, zirconium silicate, synthetic spinel and corundum are available relatively inexpensively. Frit is a solid solution which is easily available. Fused phosphate fertilizer and analogues thereof are inexpensive materials and can be processed into particles, fibers or a foamed body and are therefore desirable for giving improved heat-insulating properties and strength to coatings.

Coloring pigments, extender pigments and other extenders which are usually used are usable as inorganic compounds conjointly with those mentioned above, while siliceous or aluminous microsphere and like fine hollow inorganic particles which have a high refractive index are also effectively usable with other inorganic compounds.

The heat-insulating refractory coating compositions of this invention having heat resistance at high temperatures are prepared from alkali titanates and silicone resins, conjointly using, when desired, inorganic compounds, and extenders, coloring agents, organic solvents, etc. Especially good results are obtained when are used both of the inorganic compounds having a high density and high refractive index, and the inorganic compounds of platy crystal.

In preparing heat-insulating refractory coating compositions according to the invention, it is suitable to use 25 to 2000 parts by weight (same as hereinafter unless otherwise specified), preferably 50 to 1000 parts, more preferably 100 to 500 parts, of a silicone resin per 100 parts of an alkali titanate. Although the proportions of these ingredients vary with the kind of the silicone resin to be used and can not be strictly specified, the binder exhibits high binding ability to produce satisfactory coatings and high refractory effect when the silicone resin is used in an amount of 25 to 2000 parts per 100 parts of alkali titanate as mentioned above. Further when inorganic compounds are used, it is preferable to use 10 to 90 parts of alkali titanate and 90 to 10 parts of inorganic compound, and to use 25 to 2000 parts, more preferably 50 to 1000 parts, most preferably 100 to 500 parts, of silicone resin per 100 parts of the combined amount of titanate and inorganic compound. The alkali titanate and the inorganic compound are complementary in ratio, and especially high heat-insulating properties are available with use of 20 to 70 parts of alkali titanate and 80 to 30 parts of inorganic compound.

The heat-insulating refractory coating compositions of the invention are dispersions of alkali titanates and silicone resin, which further have dispersed therein inorganic compounds, coloring agents and organic solvents when so desired. The composition can be prepared, for example, by admixing an alkali titanate, inorganic compound, coloring agent and other additives such as an auxiliary curing agent which is usually used for silicone resin, dispersant and viscosity adjusting agent with a solution of silicone resin in an organic solvent, and treating the mixture in a high-speed mixer, roll mill, ball mill, sand mill or the like to obtain a dispersion.

The coating composition of the invention can be applied to form coatings by a usual method, for example, with use of a brush, air spray, airless spray or by immersion. Before application, a solvent may be added to the composition for dilution when desired. The composition thus applied is then dried at room temperature, or is heated at 150° to 200° C. for about 20 to about 120 minutes when desired for drying, whereby a heat-insulating refractory coating is obtained according to the invention.

The heat-insulating refractory film of this invention is prepared by dispersing an alkali titanate, and, when desired, a high-density highly refractive inorganic compound and/or endothermic inorganic compound in a silicone resin, and shaping the dispersion into a film. The dispersion can be prepared in any of the known methods. A dispersant and defoaming agent for dispersing the ingredients uniformly, and coloring agent, resin particles, flame retardant, metal particles and other extenders for adjusting the color and mechanical properties of the resulting coating can be incorporated into the dispersion as desired. Addition of particles of copper, nickel, brass, aluminum or like metal is desirable to enable the coating to reflect heat from its surface and to prevent penetration effectively.

The inorganic compounds having a high density and high refractive index and useful for the invention have excellent properties to block radiant heat. Further when endothermic inorganic compounds are brought into direct contact with slag during welding or thermal cutting, the compound is heated by the slag in contact therewith and undergoes an endothermic reaction for decomposition, reducing the heat of the slag to prevent slag particles from breaking or penetrating the coating and protect the substrate.

The heat-insulating refractory film of the invention is prepared, for example, by adding a suitable curing accelerating agent and additives to a mixture of silicone resin and alkali titanate which may further contain a high-density highly refractive inorganic compound and/or endothermic inorganic compound when so desired, further adding toluene, xylene, trichloroethylene or like organic solvent as desired to obtain a dispersion of suitable concentration, applying the dispersion to release paper by a well-known method as by immersion or with use of a spray, roll coater, reverse roll coater or knife coater, drying the coating at room temperature or heating the coating preferably at 150° to 200° C. for 1 to 30 minutes to cure the silicone resin, and separating the paper from the coating which is in the form of a film. Alternatively the film of this invention can be prepared directly from the dispersion by supplying the dispersion to a spreader such as a spreading roll of the non-transfer type and curing the silicone resin at room temperature or by heating.

Although the heat-insulating refractory film thus obtained can be used as it is, several sheets of such film may be affixed to one another or superposed in layers to a desired thickness for use. A nonflammable film may be interposed between the sheets. The proportions of silicone resin, alkali titanate, high-density highly refractive inorganic compound, endothermic inorganic compound, etc. vary with the kinds and particle sizes of the silicone resin and inorganic compounds. When too small an amount of silicone resin is used, the film will not have sufficient strength for use as a heat-insulating refractory film although having improved heat-insulating refractory properties, whereas an excess of silicone resin results in reduced heat resistance, possibly rendering the film inflammable.

According to the invention, therefore, it is preferable to use 1 to 200 parts, more preferably 30 to 100 parts, of alkali titanate per 100 parts of silicone resin. When additionally using a high-density highly refractive inorganic compound and/or endothermic inorganic compound, such compound or compounds can be used in an amount of up to 400 parts per 100 parts of the resin, with the alkali titanate partly replaced by the compounds in an amount up to ¼ the weight of the titanate. However, it is desirable to use usally 10 to 300 parts of the inorganic compounds. These high-density highly refractive inorganic compounds can be partly or wholly replaced by inorganic pigments, inorganic extenders, inorganic particulate flame retardants, etc., which should be used in an amount of up to 400 parts, preferably up to 300 parts, per 100 parts of silicone resin.

Preferably the film of the invention is 0.1 mm to 3 mm in thickness. If the thickness is less than 0.1 mm, the film has insufficient heat-insulating refractory properties, whereas if it is more than 3 mm, the film is costly, heavier and is not useful although improved in these properties.

The heat-insulating refractory sheet of the invention is prepared, for example, by adding a suitable curing accelerating agent and additives to a mixture of silicone resin and alkali titanate which may further contain a high-density highly refractive inorganic compound and/or endothermic inorganic compound when so desired, further adding toluene, xylene, trichloroethylene or like organic solvent as desired to obtain a dispersion of suitable concentration, applying the dispersion to one side or both sides of an inorganic core material such as a glass fiber fabric, silica fiber fabric, asbestos sheet, metal foil or ceramic wool sheet by a well-known method as by immersion or with use of a spray, roll coater, reverse roll coater or knife coater, and drying the dispersion at room temperature or heating the dispersion preferably at 150° to 200° C. for 1 to 30 minutes to cure the silicone resin and form a coating as bonded to the core material. Alternatively the sheet can be produced by affixing the above-mentioned heat-insulating refractory film to the surface of an inorganic core material. The proportions of silicone resin, alkali titanate, high-density highly refractive inorganic compound and/or endothermic inorganic compound, etc. are the same as in the case of the film.

The layer of the sheet of the invention is at least 0.005 mm, preferably 0.02 to 1.0 mm in thickness. If the thickness is less than 0.005 mm, the sheet has insufficient heat-insulating refractory properties, whereas if it is more than 1.0 mm, the sheet is costly, heavier and is not useful although improved in these properties.

The heat-insulating refractory film of the invention has outstanding heat-insulating and refractory properties and is flexible when incorporating an elastic silicone varnish.

The sheet of the invention also has outstanding heat-insulating and refractory properties and is flexible when a glass fiber core and an elastic silicone varnish are used.

Even when the film and sheet of the invention are brought into direct contact with hot molten slag or the like during welding, the film or the coating merely turns white and remains free of combustion, decomposition or melting to completely protect the human body, inflammables and articles. Moreover they are lightweight, tough, flexible and easy to handle.

The invention will be described in greater detail with reference to the following examples which are given for illustrative purposes only.

EXAMPLE 1

Twenty parts of potassium titanate (trade name "TISMO D," product of Otsuka Kagaku Yakuhin Kabushiki Kaisha, Japan) and 80 parts of xylene solution of a straight silicone resin (copolymer of phenylmethylsiloxane having methoxy and dimethylsiloxane, product of Toshiba Silicone Co., Ltd., Japan) containing 60% of solids were agitated in a TK Labomixer (product of Tokushu Kika Kogyo Co., Ltd., Japan) at a high speed for 5 minutes to obtain a heat-insulating refractory white coating composition having a nonvolatile content of 68%.

EXAMPLE 2

Fifteen parts of potassium titanate, 10 parts of zirconium silicate and 75 parts of 60% xylene solution of epoxy-modified silicone resin (trade name "TSR 194," product of Toshiba Silicone Co., Ltd., Japan) were treated in the same manner as in Example 1 to obtain a heat-insulating refractory white coating composition having a nonvolatile content of 70%.

EXAMPLE 3

A four-necked separable glass flask (500 ml) equipped with a stirrer, condenser, nitrogen supply tube and dropping funnel was placed on a hot water bath, and the interior air was replaced by nitrogen. Successively placed into the flask were 40 parts of acetone, 60 parts of toluene and the following mixture.

| γ-Methacryloxypropyltrimethoxysilane | 35 parts |
| Acrylonitrile | 15 |
| Glycidyl methacrylate | 10 |
| Butyl methacrylate | 40 |

After admixing 10 parts of 10% acetone solution of azobisisobutyronitrile (AIBN) with the resulting mixture with stirring, the mixture was maintained at 80° C. with stirring for 16 hours. The reaction mixture was thereafter cooled to room temperature to obtain a resin solution having a nonvolatile content of 45%.

A pure resin sample was prepared from a portion of the resin solution by adding petroleum benzine thereto to obtain a resinous precipitate, dissolving the precipitate with acetone again, adding petroleum benzine to the solution to obtain a resinous precipitate, and thereafter drying the precipitate in a vacuum at room temperature for 48 hours. The sample was found to have a limiting viscosity ($\eta$) of 1.5 dl/g as determined with use of dimethylformamide solution at 30° C.

A heat-insulating refractory coating composition having a nonvolatile content of 56% was prepared from the following ingredients in the same manner as in Example 1.

| Resin solution prepared above | 80 parts |
| Potassium titanate | 10 |
| Aluminum oxide powder | 10 |

EXAMPLE 4

The same reaction procedure as in Example 3 was repeated with the exception of using the following compounds.

| Vinyltri(β-methoxyethoxy)silane | 30 parts |
| Acrylonitrile | 20 |
| N—Butoxymethylacrylamide | 10 |
| Methyl methacrylate | 10 |
| Butyl methacrylate | 30 |

The reaction afforded a resin solution having a nonvolatile content of 44% and a limiting viscosity ($\eta$) of 1.8 dl/g. A heat-insulating refractory coating composition having a nonvolatile content of 55% was prepared with use of the resin solution in the same manner as in Example 3.

COMPARISON EXAMPLE 1

A coating composition was prepared in the same manner as in Example 1 except that a titanium oxide pigment (product of Ishihara Sangyo Kaisha, Ltd., Japan) was used in place of potassium titanate.

COMPARISON EXAMPLES 2 AND 3

Coating compositions were prepared in the same manner as in Examples 2 and 3 except that a titanium oxide pigment was used in place of the potassium titanate used in Examples 2 and 3.

TEST EXAMPLE 1

Each of the coating compositions obtained in Examples 1 to 4 and Comparison Examples 1 to 3 was applied to the surface of a steel pipe, 10 cm in inside diameter, 0.8 mm in wall thickness and 50 cm in length and thereafter baked for drying to obtain a test piece for heat insulating test. The test piece was connected to an exhaust outlet of a hot air furnace discharging an exhaust gas of 200° C. and was checked for variations in the surface temperature of the coating. Table 1 shows the results.

TABLE 1

| Ex. No. | Baking conditions | Thickness of coating ($\mu$) | Surface temp. at equilibrium (°C.) | Time taken for equilibration (min) |
|---|---|---|---|---|
| Ex. 1 | 150° C. 2 hr | 306 | 101 | 120 |
| Ex. 2 | 150° C. 2 hr | 197 | 97 | 80 |
| Ex. 3 | 150° C. 30 min | 150 | 150 | 30 |
| Ex. 4 | 150° C. 30 min | 298 | 103 | 55 |
| Comp. | 150° C. 2 hr | 310 | 200 | 10 |

TABLE 1-continued

| Ex. No. | Baking conditions | Thickness of coating (μ) | Surface temp. at equilibrium (°C.) | Time taken for equilibration (min) |
|---|---|---|---|---|
| Ex. 1 Comp. Ex. 2 | 150° C. 2 hr | 203 | 198 | 15 |
| Comp. Ex. 3 | 150° C. 30 min | 505 | 98 | 20 |

EXAMPLES 5 TO 12

Heat-insulating refractory coating compositions were prepared in the same manner as in Example 1 or 3 with use of the ingredients listed in Table 2 in the listed proportions. The compositions were tested for heat insulation in the same manner as in Test Example 1. The results are also shown in Table 2. In Example 7 potassium titanate was used which had been treated with an acid for the removal of potassium. In Example 12 potassium titanate was used which had been similarly treated, then oxidized by annealing and thereafter slowly cooled.

rafluoroethylene sheet to obtain a heat-insulating refractory film, which was cut to prepare a test sample 100 cm in width and 180 cm in length. The same procedure as above was repeated with use of varying amounts of TISMO D to prepare test samples of varying thicknesses as listed in Table 3. The samples were tested for heat-insulating and refractory properties by the method to be described below. Table 3 also shows the test results.

FIG. 1 shows a test apparatus 1 comprising a parallelepipidal frame 2 about 100 cm in width, about 180 cm in length and about 100 cm in height. At least one side of the four sides of the frame was provided with a heat-insulating tempered glass panel for inspecting the interior of the frame. The other sides were reinforced with iron angle members and heat-insulating glass panels or iron plates. A steel plate 4 specified in JIS G3101 and measuring 10 cm in width and 60 cm in length was placed on the top of the frame 2. Mounted on the steel plate 4 was an automatic cutter 3 which was movable at least over a distance of 40 cm. The sample P was set in the apparatus 1 as shown in FIG. 1, with its midportion suspended to form a furrow, the bottom of which was 50 cm below the underside of the steel plate 4. A glass

TABLE 2

| | Coating composition | | | | | | |
|---|---|---|---|---|---|---|---|
| | Potassium titanate | Silicone resin | | Extender | | Other additive | |
| Ex. No. | (parts) | Kind | Amount (parts) | Kind | Amount (parts) | Kind | Amount (parts) |
| 5 | 20 | Polydiphenylsiloxane (60%) Epoxy-modified silicone resin (60%) | 30 50 | | | | |
| 6 | 15 | Polydiphenylsiloxane (60%) Epoxy-modified silicone resin (60%) | 30 45 | Frit | 5 | Talc | 5 |
| 7 | 10 | Polydimethylsiloxane (60%) | 80 | Particulate fused phosphate fertilizer | 10 | | |
| 8 | 5 | Resin of Example 3 | 80 | Mica | 15 | | |
| 9 | 25 | Resin of Example 2 | 70 | Carborundum | 5 | | |
| 10 | 15 | Polyester-modified silicone resin | 70 | Foamed fused phosphate fertilizer | 10 | Siliceous microsphere | 5 |
| 11 | 30 | Alkyd-modified silicone resin | 60 | Zirconium silicate | 10 | | |
| 12 | 10 | Polydiphenylsiloxane, Epoxy-modified silicone resin | 30 50 | Corundum | 10 | | |

| | Test result | | | |
|---|---|---|---|---|
| Ex. No. | Baking condition | Coating thickness (μ) | Temp. at equilibrium (°C.) | Equilibration time (min) |
| 5 | 150° C. 2 hr | 200 | 110 | 105 |
| 6 | " | 300 | 94 | 125 |
| 7 | " | 150 | 105 | 65 |
| 8 | 150° C. 30 min | 170 | 130 | 55 |
| 9 | 150° C. 2 hr | 180 | 115 | 70 |
| 10 | " | 250 | 98 | 110 |
| 11 | " | 300 | 90 | 155 |
| 12 | " | 200 | 96 | 65 |

EXAMPLE 13

Thirty parts of a silicone resin (trade name "TSE 200" having a nonvolatile content of 100% and manufactured by Toshiba Silicone Co., Ltd., Japan) was dissolved in 70 parts of xylene, and 0.5 part of curing agent and a specified amount of potassium titanate (TISMO D) were uniformly admixed with the solution. The mixture was spread over a 0.05-mm-thick polytetrafluoroethylene sheet to a specified thickness, dried in air for 5 minutes and cured by heating at 200° C. for 15 minutes. The coating formed was peeled off the polytetwool heat-insulating plate 6 specified as No. 2 in JIS A9505 and having a nominal thickness of 25 mm was placed immediately under the sample at a distance of 100 cm from the underside of the steel plate 4. A sheet of paper 7 weighing 51.8 g/m² as specified in JIS P3104 was placed over the plate 6 for detecting penetration. The cutter 3 had a nozzle 5 with an orifice diameter of 1.0 mm and cutting flame length of 9 to 14 cm, positioned with its nozzle 5 at a distance of 6 to 9 mm from the steel plate 4 and was moved to cut the steel plate 4 over a distance of 40 cm. The heat-insulating refractory properties of the sample P were evaluated by checking the sample P and the penetrating detecting paper 7 for flaming.

The properties were evaluated according to the following five criteria.

A: Not flaming and free from holes caused by the penetration of sparks and objectionable to the prevention of fire when exposed to the sparks resulting from the cutting of 9-mm-thick steel plate.
B: Same as above when the steel plate is 4.5 mm in thickness.
C: Same as above when the steel plate is 3.2 mm in thickness.
D: Having holes caused by the penetration of sparks and objectionable to the prevention of fire when a 3.2-mm-thick steel plate is cut.
E: Flaming when a 3.2-mm-thick steel plate is cut.

The amounts of TISMO D listed in Table 3 are in parts per 100 parts of the solids of the silicone resin.

TABLE 3

| Sample | Amount of TISMO D USED | Thickness (mm) | Test result | Remarks |
|---|---|---|---|---|
| 1 | 15 | 0.01 | E | Penetrated |
|  |  | 0.02 | E | " |
| 2 | 30 | 0.01 | D | " |
|  |  | 0.03 | D |  |
| 3 | 45 | 0.03 | D | Self-extinguishing |
|  |  | 0.05 | D | Penetrated |
| 4 | 60 | 0.03 | C | High resistance to bending |
|  |  | 0.03 | D | Penetrated |
| 5 | 75 | 0.03 | B | Penetrated |

TABLE 3-continued

| Sample | Amount of TISMO D USED | Thickness (mm) | Test result | Remarks |
|---|---|---|---|---|
|  |  | 0.05 | D | " |
| 6 | 90 | 0.02 | A | " |
| 7 | 100 | 0.01 | A | " |
| 8 | 120 | 0.01 | A | " |
| 9 | 150 | 0.01 | A | " |
| 10 | 200 | 0.01 | A | Good resistance to bending |
| 11 | 300 | 0.01 | A | Low resistance to bending |

EXAMPLE 14

A Mixture of 50 parts of a silicone resin (trade name "TSR 2038" having a nonvolatile content of 100% and manufactured by Toshiba Silicone Co., Ltd., Japan), 100 parts of xylene, 25 parts of potassium titanate (TISMO D), 20 parts of aluminum silicate, 5 parts of zircon sand, 5 parts of aluminum hydroxide and 3 parts of curing agent was treated in a dissolver to obtain a homogeneous dispersion. A heat-insulating refractory film, 1 mm in thickness, was prepared from the dispersion and tested in the same manner as in the preceding example. The film was evaluated as A.

EXAMPLES 15 TO 24

Heat-insulating refractory films were prepared and tested in the same manner as in the preceding example with the exception of using different kinds of silicone resins, alkali titanates and other materials in varying amounts. Table 4 shows the results.

TABLE 4

| | Silicone resin | | Alkali titanate | | High-density highly refractive inorganic compound | | Endothermic inorganic compound | |
|---|---|---|---|---|---|---|---|---|
| Ex. | Kind | Amount (parts) | Kind | Amount (parts) | Kind | Amount (parts) | Kind | Amount (parts) |
| 15 | KR2706 (30% nonvolatiles) | 100 | TISMO D | 50 | | | | |
| 16 | TSE201 (100% nonvolatiles) | 100 | " | 80 | Zircon sand | 10 | Aluminum hydroxide | 100 |
| 17 | YR3270 (30% nonvolatiles) | 100 | " | 30 | Frit | 20 | " | 150 |
| 18 | TSE200 (100% nonvolatiles) | 100 | " | 60 | Alumina powder | 30 | Zinc carbonate | 100 |
| 19 | TSE 200 | 100 | TISMO L | 50 | Fused phosphate fertilizer powder | 50 | Aluminum silicate | 100 |
| 20 | YR3270 | 100 | TISMO D | 80 | Apatite powder | 100 | | |
| 21 | KR2706 | 100 | " | 100 | | | Aluminum hydroxide | 50 |
| 22 | KR2706 | 100 | TISMO L | 100 | | | Alum | 60 |
| 23 | TSE201 KR2706 | 20 80 | TISMO D | 70 | | | Aluminum silicate | 80 |
| 24 | TSE201 YR3270 | 40 60 | " | 120 | | | | |
| Comp. Ex.4 | YR3270 | 100 | | | | | | |

| | Metal powder | | Other additive | | | |
|---|---|---|---|---|---|---|
| Ex. | Kind | Amount (parts) | Kind | Amount (parts) | Thickness of coating (mm) | Test result |
| 15 | | | Xylene | 100 | 2 | C |
|  | | | Curing agent | 4 | | |
| 16 | | | Toluene | 200 | 3 | B |
|  | | | Curing agent | 5 | | |
| 17 | | | Xylene | 150 | 1 | B |
|  | | | Curing agent | 4 | | |
| 18 | | | Xylene | 250 | 3 | B |
|  | | | Curing agent | 5 | | |
| 19 | Aluminum powder | 10 | Xylene | 230 | 2 | A |
|  | | | Curing agent | 4 | | |
| 20 | | | Xylene | 80 | 2 | B |
|  | | | Curing agent | 6 | | |
| 21 | Aluminum powder | 15 | Xylene | 110 | 2 | A |

TABLE 4-continued

|  |  |  |  |  |
|---|---|---|---|---|
| 22 | Curing agent | 4 |  |  |
|  | Xylene | 70 | 2.5 | B |
|  | Curing agent | 4 |  |  |
| 23 | Xylene | 110 | 1.5 | C |
|  | Curing agent | 5 |  |  |
| 24 | Xylene | 130 |  |  |
|  | Titanium oxide | 20 | 2 | C |
|  | Curing agent | 4 |  |  |
| Comp. Ex.4 | Titanium oxide | 100 | 3 | E |
|  | Curing agent | 6 |  |  |

EXAMPLE 25

A specified amount of potassium titanate (TISMO D) was admixed with a mixture of 100 parts of silicone resin solution (trade name "TSR 1120" having a nonvolatile content of 30% and manufactured by Toshiba Silicone Co., Ltd., Japan) and 2 parts of curing agent, and the resulting mixture was stirred to obtain a uniform dispersion. The dispersion was applied to one side of asbestos paper, 0.5 mm in thickness, to a specified thickness, dried in air for 5 minutes and heated at 200° C. for 5 minutes to prepare a heat-insulating refractory sheet having a titanate-containing silicone resin layer on one side of the asbestos paper. The sheet was cut into a rectangular test sample 100 cm in width and 180 cm in length. The same procedure as above was repeated with use of varying amounts of TISMO D to prepare test samples and test the samples. Table 5 shows the results.

TABLE 5

| Sample | Amount of TISMO D used | Thickness (mm) | Test result | Remarks |
|---|---|---|---|---|
| 1 | 10 | 0.03 | E | Penetrated |
| 2 | 20 | 0.03 | E | " |
| 3 | 30 | 0.03 | D | Self-extinguishing |
| 4 | 50 | 0.02 | C | High resistance to bending |
| 5 | 70 | 0.02 | B | High resistance to bending |
| 6 | 100 | 0.01 | A | High resistance to bending |
| 7 | 120 | 0.01 | A | High resistance to bending |
| 8 | 150 | 0.01 | A | Good resistance to bending |

TABLE 5-continued

| Sample | Amount of TISMO D used | Thickness (mm) | Test result | Remarks |
|---|---|---|---|---|
| 9 | 200 | 0.01 | A | Low resistance to bending |
| 10 | 300 | 0.01 | A | Low resistance to bending |
| Comp. Ex. 5 | Commercial asbestos (3A grade) |  | E | Penetrated |

EXAMPLE 26

To 100 parts of a silicone resin solution (trade name "KR 2706" having a nonvolatile content of 30% and manufactured by Shinetsu Chemical Company, Japan) were added 15 parts of potassium titanate (TISMO D), 10 parts of zinc oxide, 60 parts of aluminum hydroxide, 50 parts of xylene and 6 parts of curing agent, and the mixture was made into a uniform dispersion with use of a dissolver. The dispersion was applied to one side of asbestos paper to a thickness of 0.2 mm, dried and cured in the same manner as in the preceding example to obtain a heat-insulating refractory sheet coated with a silicone resin layer containing the potassium titanate, zinc oxide and aluminum hydroxide. The sheet was tested in the same manner as above and evaluated as A.

EXAMPLES 27 TO 36

Heat-insulating refractory sheets were prepared and tested in the same manner as in the preceding example with the exception of using different kinds of inorganic core materials and further using different kinds of silicone resins, alkali titanates and other materials in varying amounts. Table 6 shows the results.

TABLE 6

| Ex. No. | Inorganic Core material | Silicone resin Kind | Amount (parts) | Alkali titanate Kind | Amount | High-density highly refractive inorganic compound Kind | Amount (parts) |
|---|---|---|---|---|---|---|---|
| 27 | Asbestos paper (0.5mm thick) | YR3270 (50% nonvolatiles) | 100 | TISMO D | 15 |  |  |
| 28 | Glass fiber nonwoven fabric (0.3mm thick) | KR2706 (30% nonvolatiles) | 100 | " | 10 | Frit | 10 |
| 29 | Asbestos paper (0.5mm thick) | TSE201 (100% nonvolatiles) | 100 | " | 50 | Fused phosphate fertilizer powder | 30 |
| 30 | Asbestos paper (0.3mm thick) | TSE201 | 100 | " | 50 | Alumina powder | 15 |
| 31 | Carbon fiber cloth (300g/m²) | KR2706 | 100 | " | 20 | Zircon sand | 5 |
| 32 | Glass fiber woven fabric (300g/m²) | YR3270 | 100 | TISMO L | 20 | Apatite powder | 15 |
| 33 | Alumina silicate paper (0.3mm thick) | YR3270 | 100 | " | 30 |  |  |
| 34 | Asbestos paper (0.3mm thick) | TSE700 (100% nonvolatiles) | 100 | TISMO D | 80 |  |  |
| 35 | Asbestos paper | TSE201 | 70 | TISMO L | 60 |  |  |

TABLE 6-continued

|  |  |  |  |  |  |
|---|---|---|---|---|---|
| 36 | (0.3mm thick) Glass fiber woven fabric (400g/m²) | KR2700 TSE201 YR3270 | 30 50 50 | " | 100 |
| Comp. Ex.6 | Asbestos paper (0.5mm thick) | YR3270 | 100 |  |  |

| Ex. No. | Endothermic inorganic compound | | Metal powder | | Other additive | | Thickness of coating (mm) | Test result |
|---|---|---|---|---|---|---|---|---|
| | Kind | Amount (parts) | Kind | Amount (parts) | Kind | Amount (parts) | | |
| 27 | Zinc carbonate | 120 | | | Xylene Curing agent | 20 4 | One side 0.02 | B |
| 28 | Aluminum hydroxide | 100 | | | Toluene Curing agent | 80 6 | Both sides 0.01 each | A |
| 29 | Aluminum hydroxide | 150 | | | Xylene Curing agent | 150 5 | Both sides 0.01 each | A |
| 30 | Aluminum hydroxide | 150 | Aluminum powder | 15 | Xylene Curing agent | 170 5 | One side 0.015 | A |
| 31 | Aluminum silicate | 80 | | | Xylene Curing agent | 70 6 | One side 0.015 | A |
| 32 | | | | | Xylene Curing agent | 30 4 | One side 0.01 | B |
| 33 | Aluminum silicate | 60 | Aluminum powder | 5 | Xylene Curing agent | 30 4 | Both sides 0.05 each | A |
| 34 | Aluminum hydroxide | 50 | | | Xylene Curing agent | 200 5 | Both sides 0.02 each | A |
| 35 | Alum | 20 | | | Xylene Curing agent | 100 5 | Both sides 0.01 each | A |
| 36 | | | | | Xylene Titanium oxide Curing agent | 200 20 5 | Both sides 0.01 each | A |
| Comp. Ex.6 | | | | | Titanium oxide Curing agent | 30 5 | Both sides 0.05 each | E |

We claim:

1. A heat-insulating refractory material consisting essentially of an alkali titanate and a silicone resin.

2. A heat-insulating refractory material as defined in claim 1 which is a coating composition consisting essentially of an alkali titanate and a silicone resin.

3. A heat-insulating refractory material as defined in claim 1 which is a film consisting essentially of an alkali titanate and a silicone resin.

4. A heat-insulating refractory material as defined in claim 1 which is a sheet comprising an inorganic core material and a layer consisting essentially of an alkali titanate and a silicone resin.

5. A heat-insulating refractory material as defined in claim 1 wherein the alkali titanate is a compound represented by the formula $$M_2O.nTiO_2.mH_2O$$

wherein M is an alkali metal, n is a positive real number of up to 8, and m is 0 or a positive real number of up to 4.

6. A heat-insulating refractory material as defined in claim 5 wherein the alkali titanate is a compound represented by the formula $$K_2O.6TiO_2.mH_2O$$

wherein m is as defined above.

7. A heat-insulating refractory material as defined in claim 5 wherein the alkali titanate is at least 5 μm in fiber length and at least 20 in aspect ratio.

8. A heat-insulating refractory material as defined in claim 1 wherein the silicone resin is an organopolysiloxane silicone resin, polyacryloxyalkylalkoxysilane silicone resin or polyvinylsilane silicone resin.

9. A heat-insulating refractory material as defined in claim 8 wherein the organopolysiloxane silicone resin is a straight silicone resin selected from the group consisting of polydimethylsiloxane, polydiphenylsiloxane, polymethylphenylsiloxane and copolymers of these siloxanes, which have at least one of substituents including hydrogen, vinyl, allyl, hydroxyl, alkoxy having 1 to 4 carbon atoms, amino and mercapto.

10. A heat-insulating refractory material as defined in claim 8 wherein the organopolysiloxane silicone resin is a modified silicone resin obtained by reacting a straight silicone resin with an another resin.

11. A heat-insulating refractory material as defined in claim 9 wherein the polydimethylsiloxane silicone resins are those having a CH₃/Si ratio of 1.2 to 1.8.

12. A heat-insulating refractory material as defined in claim 11 wherein the CH₃/Si ratio is 1.3 to 1.7.

13. A heat-insulating refractory material as defined in claim 8 wherein the polyacryloxyalkylalkoxysilane silicone resin is a homopolymer of an acryloxyalkylalkoxysilane compound represented by the formula

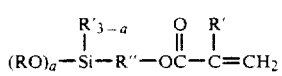

wherein R is a monovalent hydrocarbon group having 1 to 10 carbon atoms, R' is hydrogen or a monovalent hydrocarbon group having 1 to 12 carbon atoms, R" is a bivalent hydrocarbon group having 2 to 10 carbon atoms, and a is an integer of 1 to 3.

14. A heat-insulating refractory material as defined in claim 8 wherein the polyacryloxyalkylalkoxysilane silicone resin is a copolymer of the above acryloxyalkylalkoxysilane compound and an α,β-unsaturated compound represented by the formula

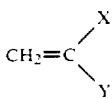

wherein X is hydrogen, methyl or chlorine atom, Y is a member selected from the group consisting of hydrogen, chlorine atom, a monovalent hydrocarbon group having 1 to 10 carbon atoms, vinylphenyl, pyridyl, 2-oxo-1-pyrrolidinyl, cyano,

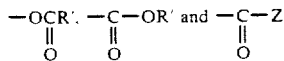

wherein R' is as defined above, and Z is a member selected from the group consisting of —OCH$_2$CH$_2$OH,

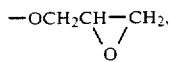

—NH$_2$, N-methylol and N-alkoxymethylol.

15. A heat-insulating refractory material as defined in claim 8 wherein the polyvinylsilane silicone resin is a homopolymer of a vinylsilane compound of the formula

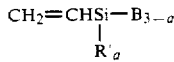

wherein a is an integer of 1 to 3, B is OR' or OR"—OR' (R' and R" are as defined above).

16. A heat-insulating refractory material as defined in claim 8 wherein the polyvinylsilane silicone resin is a copolymer of the above vinylsilane compound and the above α,β-unsaturated compound represented by the formula

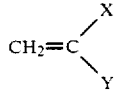

wherein X and Y are as defined above.

17. A heat-insulating refractory coating composition as defined in claim 2 further comprising an inorganic compound having a high density and a high refractive index and/or an inorganic compound of platy crystal.

18. A heat-insulating refractory coating composition as defined in claim 2 further comprising a coloring agent and/or an organic solvent.

19. A heat-insulating refractory coating composition as defined in claim 17 wherein the high-density and highly refractive inorganic compound is a natural or synthetic mineral having a specific gravity of at least 2.8 and a refractive index of at least 1.50, frit, high-density glass or fused phosphate fertilizer.

20. A heat-insulating refractory coating composition as defined in claim 19 wherein the natural or synthetic mineral is dolomite, magnesite, aragonite, apatite, spinel, corundum, zircon or silicone carbide.

21. A heat-insulating refractory coating composition as defined in claim 17 wherein the inorganic compound of platy crystal is a clayey or micaceous mineral.

22. A heat-insulating refractory coating composition as defined in claim 21 wherein the inorganic compound of platy crystal is a natural or synthetic mica.

23. A heat-insulating refractory coating composition as defined in claim 2 comprising 25 to 2000 parts by weight of the silicone resin per 100 parts by weight of the alkali titanate.

24. A heat-insulating refractory coating composition as defined in claim 17 which comprises 10 to 90 parts by weight of the alkali titanate, 90 to 10 parts by weight of the inorganic compound or compounds, and 25 to 2000 parts by weight of the silicone resin per 100 parts by weight of the alkali titanate and the inorganic compound or compounds combined.

25. A heat-insulating refractory film as defined in claim 3 further comprising an inorganic compound having a high density and a high refractive index and/or an endothermic inorganic compound.

26. A heat-insulating refractory film as defined in claim 25 wherein the high-density and highly refractive inorganic compound is a natural or synthetic mineral having a specific gravity of at least 2.8 and a refractive index of at least 1.50, frit, high-density glass or fused phosphate fertilizer.

27. A heat-insulating refractory film as defined in claim 26 wherein the natural or synthetic mineral is dolomite, magnesite, aragonite, apatite, spinel, corundum, zircon or silicone carbide.

28. A heat-insulating refractory film as defined in claim 25 wherein the endothermic inorganic compounds are those which release crystal water or carbon dioxide, absorb heat on decomposition, or undergo phase conversion.

29. A heat-insulating refractory film as defined in claim 28 wherein the endothermic inorganic compound is calcined gypsum, alum, calcium carbonate, aluminum hydroxide or aluminum silicate of hydrotalcite group.

30. A heat-insulating refractory film as defined in claim 3 comprising 1 to 200 parts by weight of the alkali titanate per 100 parts by weight of the silicone resin.

31. A heat-insulating refractory film as defined in claim 25 which comprises 1 to 200 parts by weight of the alkali titanate and 0.25 to 200 parts by weight of the inorganic compound or compounds per 100 parts by weight of the silicone resin.

32. A heat-insulating refractory film as defined in claim 3 wherein the thickness of the film is 0.1 mm to 3 mm.

33. A heat-insulating refractory sheet as defined in claim 4 wherein an inorganic compound having a high density and a high refractive index and/or an endothermic inorganic compound are further incorporated in the layer.

34. A heat-insulating refractory sheet as defined in claim 33 wherein the high-density and highly refractive inorganic compound is a natural or synthetic mineral having a specific gravity of at least 2.8 and a refractive index of at least 1.50, frit, high-density glass or fused phosphate fertilizer.

35. A heat-insulating refractory sheet as defined in claim 34 wherein the natural or synthetic mineral is dolomite, magnesite, aragonite, apatite, spinel, corundum, zircon or silicone carbide.

36. A heat-insulating refractory sheet as defined in claim 33 wherein the endothermic inorganic compounds are those which release crystal water or carbon dioxide, absorb heat on decomposition, or undergo phase conversion.

37. A heat-insulating refractory sheet as defined in claim 36 wherein the endothermic inorganic compound is calcined gypsum, alum, calcium carbonate, aluminum hydroxide or aluminum silicate of hydrotalcite group.

38. A heat-insulating refractory sheet as defined in claim 4 comprising 1 to 200 parts by weight of the alkali titanate per 100 parts by weight of the silicone resin.

39. A heat-insulating refractory sheet as defined in claim 33 which comprises 1 to 200 parts by weight of the alkali titanate and 0.25 to 200 parts by weight of the inorganic compound or compounds per 100 parts by weight of the silicone resin.

40. A heat-insulating refractory sheet as defined in claim 4 wherein the inorganic core material is a glass fiber fabric, silica fiber fabric, asbestos sheet, metal foil or ceramic wool sheet.

41. A heat-insulating refractory sheet as defined in claim 4 wherein the thickness of the layer is 0.005 to 1 mm.

* * * * *